Patented Feb. 17, 1948

2,436,368

UNITED STATES PATENT OFFICE 2,436,368

CATALYTIC HYDROGENATION OF AMINO-ACETONITRILE TO ETHYLENE DIAMINE

Arthur G. Weber and Clarence D. Bell, Wilmington, Del., assignors to E. I. du Pont de Nemours & Company, Wilmington, Del., a corporation of Delaware No Drawing. Application June 27, 1944, Serial No. 542,434

8 Claims. (Cl. 260—583)

This invention relates to a process for the preparation of ethylene diamine and more particularly to the conditioning of catalysts for the hydrogenation of aminoacetonitrile to ethylene diamine.

Ethylene diamine can be made by passing aminoacetonitrile continuously into a tubular reaction zone together with ammonia, the hydrogenation being conducted at temperatures ranging between 25 and 300° C. and pressures between 100 and 500 atmospheres or higher. Suitable hydrogenation catalysts are used and preferably catalysts free from alkali metal and alkaline earth metal oxides, carbonates and the hydroxides, examples of which are the nickel aluminum skeleton catalysts, nickel alloy catalysts, copper chromate and nickel or cobalt catalysts supported or not on kieselguhr, silica gel or similar inert supports.

In accord with this invention, it has been found that if suitable catalysts such, for example, as those described, are used and particularly the cobalt catalysts which are prepared by crushing the cobalt oxide to a suitable size and reducing it in the presence of hydrogen at a temperature between 250 and 450° C., the life of the catalyst and similar catalysts can be greatly extended for this hydrogenation if the catalyst is conditioned prior to use.

The conditioning operation is effected by carrying out the hydrogenation either with reduced aminoacetonitrile space velocity, in the order of, say, 50% of the normal space velocity, or with increased flow of ammonia, say in the order of 10 pounds of ammonia or more per pound of aminoacetonitrile. The normal space velocity of aminoacetonitrile into the reaction is between about 0.25 and 0.40 (i. e., volume of nitrile per volume of catalyst per hour). The normal flow of ammonia into the reaction is 5.0 to 9.0 pounds of ammonia per pound of aminoacetonitrile. The conditioning operation is conducted at a nitrile space velocity in the order of 0.1 to a maximum of about 0.2, with about 6 pounds of ammonia per pound of aminoacetonitrile or at a nitrile space velocity in the order of 0.2 to 0.25 with 10 pounds or more of ammonia per pound of aminoacetonitrile, other hydrogenation conditions being normal, i. e., for example, using in addition 0.25 to 1.5 pounds of water and 20 to 200 cubic feet of hydrogen per pound of the aminoacetonitrile. After the conditioning period has been in progress for from 50 to 100 hours, the nitrile space velocity and/or the ammonia rate may be increased to normal and the catalyst will retain its acquired high activity over a long period.

The catalyst conditioning is a function of the concentration of aminoacetonitrile in the ammoniacal solution passing over the catalyst. This is shown by the fact that within limits the greater the ammonia content of the conditioning solution, the higher is the absolute rate at which aminoacetonitrile may be hydrogenated during conditioning of a given volume of catalyst. The choice of aminoacetonitrile and ammonia flows to be used for conditioning should be such that essentially complete conversion of the aminoacetonitrile is achieved throughout the conditioning period, and any combination of nitrile and ammonia rates meeting this requirement will result in effective conditioning. The rate at which the catalyst gains activity does not appear to be dependent on the type of conditioning employed. The amount of other ingredients (water and hydrogen) may be varied over a wide range without effect.

If, on the contrary, initial operating flows are such that the catalyst is incapable of converting all the aminoacetonitrile to which it is exposed (i. e., initial operation at a high nitrile space velocity in relatively concentrated ammonia solution such as normally used), the catalyst rapidly decreases in activity and fails after a short period of operation. Regeneration of this catalyst may be accomplished by washing with pure ammonia and conditioning as above.

*Example I.*—Into a vertically-positioned stainless steel cartridge type converter having 2 7/16" internal diameter and an over-all length of about 72", a cobalt catalyst (prepared by the reduction of 1/8" cobalt oxide pills with hydrogen at a temperature between 250° and 450° C.) was charged to fill completely the reaction zone. Upwardly through this converter from 50 to 100 cubic feet (STP) of hydrogen, from 0.25 to 1.5 pounds of water, and 6 pounds of ammonia, all per pound of aminoacetonitrile, was passed at a nitrile space velocity of 0.25. The reaction was conducted at 95° C. to 130° C. under 300 atmospheres total pressure. After 6 hours operation the catalyst showed evidence of failure as judged by the fact that the zone of maximum reaction indicated by maximum catalyst temperature had moved from the converter inlet to within a few inches of the converter exit.

The catalyst was regenerated by washing with ammonia and operation resumed with the nitrile space velocity reduced to 0.2 and rate of ammonia injection set at 8 pounds of ammonia per pound of nitrile, other conditions as before. A similar decrease in catalyst activity was noted after operation for 8 hours under these conditions.

The catalyst was again regenerated and the space velocity reduced to 0.15 with the injection of ammonia at 6–8 pounds of ammonia per pound of nitrile. Operation was continued under these conditions for 80 hours with excellent conversion of aminoacetonitrile to ethylene diamine (92.5%). At the end of this time the nitrile space velocity was increased to 0.25–0.30 with the injection of 6 to 8 pounds of ammonia per pound of aminoacetonitrile, other ingredients remaining in the ranges described. The catalyst thus conditioned had an excellent life cycle as there was no evidence of permanent loss of activity after 470 hours operation with sustained high conversions.

Practically, the conditioning of the catalyst in converters of relatively great length to diameter may be controlled by observation of that portion of the catalyst bed at which maximum temperature is reached. This is referred to as the "hot spot," which is established at a point in the converter adjacent the entrance, generally within the first hour of operation. In a converter, such as that described in the example, having a catalyst bed provided with external cooling means, the "hot spot" will be found at the start of the reaction, near the inlet of the converter, whether or not the catalyst is being conditioned. In the event, however, that the normal operating flows are employed, the "hot spot" will not stay in this portion of the bed, but will gradually advance into the bed at a more or less rapid rate, according, inter alia, to the catalyst used and/or space velocities of reactants or ammonia throughout. When the "hot spot" reaches the end of the catalyst bed, it will be found that the catalyst has lost its activity and should be replaced or reconditioned.

In accord with the catalyst conditioning process of this invention, the "hot spot" is not permitted to advance appreciably into the bed for a period of at least 20 hours, and it can be prevented from advancing into the bed either by lowering the space velocity of the aminoacetonitrile, as heretofore designated, or by increasing the ammonia flow by the amounts heretofore designated. A small advance can be tolerated, say, to about 25% into the bed, but is not recommended.

If the reaction is conducted in a converter with no external cooling, the "hot spot" characteristics will be somewhat different. It will be found that the temperature of the catalyst bed will increase to a maximum adjacent the inlet and throughout the rest of the bed the temperature will remain substantially constant as no heat is withdrawn. For the purpose of control in such a system, therefore, it may be considered that the first point of maximum temperature is considered the "hot spot" and this "hot spot" is, in the manner described, prevented from advancing into the bed for the conditioning period.

We claim:

1. In a process for the preparation of ethylene diamine by the hydrogenation of aminoacetonitrile in the presence of ammonia and a cobalt oxide hydrogenation catalyst, the step which comprises conditioning the hydrogenation catalyst during initial operation by conducting the hydrogenation reaction with a flow of ammonia and aminoacetonitrile such that the hottest part of the catalyst bed after being established is, for the first 20 hours of operation, at approximately its initial position in the bed.

2. In a process for the preparation of ethylene diamine by the hydrogenation of aminoacetonitrile in the presence of ammonia and a cobalt oxide hydrogenation catalyst wherein the reactants are continuously passed through a catalyst reaction zone, the steps which comprise conditioning the hydrogenation catalyst by initially conducting the hydrogenation reaction with an aminoacetonitrile space velocity less than 50% of a space velocity from 0.25 to 0.40 volume of aminoacetonitrile per volume of catalyst per hour for at least the first 20 hours of operation and, after the conditioning of the catalyst, continuing the hydrogenation at normal aminoacetonitrile space velocity.

3. In a process for the preparation of ethylene diamine by the hydrogenation of aminoacetonitrile in the presence of ammonia and a cobalt oxide hydrogenation catalyst wherein the reactants are continuously passed through a catalyst reaction zone, the step which comprises conditioning the hydrogenation catalyst by initially conducting the hydrogenation reaction with an aminoacetonitrile space velocity of between about 0.1 and 0.15 and after at least 20 hours of conditioning at this space velocity, conducting the hydrogenation at an aminoacetonitrile space velocity of about 0.25 to 0.40.

4. In a process for the preparation of ethylene diamine by the hydrogenation of aminoacetonitrile in the presence of ammonia and a cobalt oxide hydrogenation catalyst wherein the reactants are continuously passed through a catalyst reaction zone, the step which comprises conditioning the hydrogenation catalyst during initial operation by a process wherein initial operation is conducted with an 0.25 to 0.40 aminoacetonitrile space velocity together with the use of at least 10 pounds of ammonia per pound of aminoacetonitrile for at least 20 hours.

5. In a process for the preparation of ethylene diamine by the hydrogenation of aminoacetonitrile in the presence of a cobalt oxide hydrogenation catalyst and ammonia, the step which comprises conditioning the hydrogenation catalyst during initial operation by the introduction of aminoacetonitrile, ammonia, and hydrogen at such a rate that for a period of at least 20 hours, the highest temperature reached is adjacent the inlet portion of the bed.

6. In a process for the preparation of ethylene diamine by the hydrogenation of aminoacetonitrile in the presence of ammonia and a hydrogenation catalyst wherein the reactants are continuously passed through a catalyst reaction zone, the step which comprises conditioning a cobalt oxide hydrogenation catalyst during initial operation by conducting the hydrogenation process at an aminoacetonitrile space velocity of between about 0.1 and 0.15 and after about 20 hours of conditioning at this space velocity, conducting the hydrogenation at an aminoacetonitrile space velocity of about 0.25 to 0.40.

7. In a process for the preparation of ethylene diamine by the hydrogenation of aminoacetonitrile in the presence of ammonia and a hydrogenation catalyst wherein the reactants are continuously passed through a catalyst reaction zone, the step which comprises conditioning the cobalt oxide hydrogenation catalyst during initial operation by a process wherein initial operation is conducted with an 0.25 to 0.40 aminoacetonitrile space velocity and with at least 10 pounds of ammonia per pound of aminoacetonitrile for at least 20 hours, and thereafter reducing the ammonia throughout to 5 to 9 pounds per pound of aminoacetonitrile.

8. In a process for the preparation of ethylene diamine by the hydrogenation of aminoacetonitrile in the presence of ammonia and a hydrogenation catalyst wherein the reactants are continuously passed through a catalyst zone, the step which comprises conditioning a cobalt oxide hydrogenation catalyst during its initial operation by conducting the hydrogenation reaction with a flow of ammonia and aminoacetonitrile such that the hottest part of the catalyst reaction zone after being established is, for the first 20 hours of operation, adjacent the inlet portion of the zone.

ARTHUR G. WEBER.
CLARENCE D. BELL.

REFERENCES CITED

The following references are of record in the file of this patent:

UNITED STATES PATENTS

| Number | Name | Date |
|---|---|---|
| 2,232,598 | Farlow | Feb. 18, 1941 |

OTHER REFERENCES

Beilstein, Handbuch Der Org. Chem., vol. III–IV, 4th ed., second supplement, page 676.

Ellis, Hydrogenation of Organic Substances, 3rd ed., revised and enlarged, 1930, pages 69–70.